United States Patent [19]
Poiencot

[11] Patent Number: 6,061,980
[45] Date of Patent: May 16, 2000

[54] CUSHIONING PAD

[75] Inventor: Malcolm A. Poiencot, 332 Firwood Dr., Houma, La. 70360

[73] Assignee: Malcolm A. Poiencot, Houma, La.

[21] Appl. No.: 09/244,808

[22] Filed: Feb. 5, 1999

[51] Int. Cl.$^7$ .................................................. E04F 11/16
[52] U.S. Cl. ................................. 52/177; 108/64; 108/65; 404/21; 404/32; 404/44; 428/53
[58] Field of Search ..................... 248/633, 632, 248/560; 2/24; 52/177, 181, 588.1, 589.1, 590.1, 126.6, 390, 391, 506.05, 506.01, 590.2, 590.3; 108/64, 65, 185; 404/19–21, 32, 34, 35, 44, 47, 50; 428/44, 53, 57–67, 81

[56] References Cited

U.S. PATENT DOCUMENTS

| | | | |
|---|---|---|---|
| 257,713 | 5/1882 | Hyatt | 404/21 |
| 753,078 | 2/1904 | Jacobs | 404/21 |
| 3,206,785 | 9/1965 | Heil | 404/19 |
| 3,726,255 | 4/1973 | Marr . | |
| 4,074,948 | 2/1978 | Heater . | |
| 4,287,693 | 9/1981 | Collette | 52/177 |
| 4,619,055 | 10/1986 | Davidson . | |
| 5,018,235 | 5/1991 | Stamatiou . | |
| 5,052,158 | 10/1991 | D'Luzansky | 52/177 |
| 5,059,463 | 10/1991 | Peters . | |
| 5,085,912 | 2/1992 | Algiere | 404/21 X |
| 5,190,799 | 3/1993 | Ellingson, III | 52/177 X |
| 5,302,049 | 4/1994 | Schmanski | 404/32 X |

FOREIGN PATENT DOCUMENTS

| | | | |
|---|---|---|---|
| 4-83055 | 3/1992 | Japan | 52/177 |

*Primary Examiner*—Richard Chilcot
*Attorney, Agent, or Firm*—Wendy Buskop; Bayko Gibson et al

[57] ABSTRACT

A cushioning pad or mat for protecting a rig surface or alternatively, an article placed on the pad wherein the mat is made of elements which are laminated construction with a base layer of neoprene, or similar materials, and the elements are connected with channels and the top of the elements are connected to the base of the elements using between 2 and 32 rib members, which can be rivets and a method of making such a cushioning pad.

19 Claims, 3 Drawing Sheets

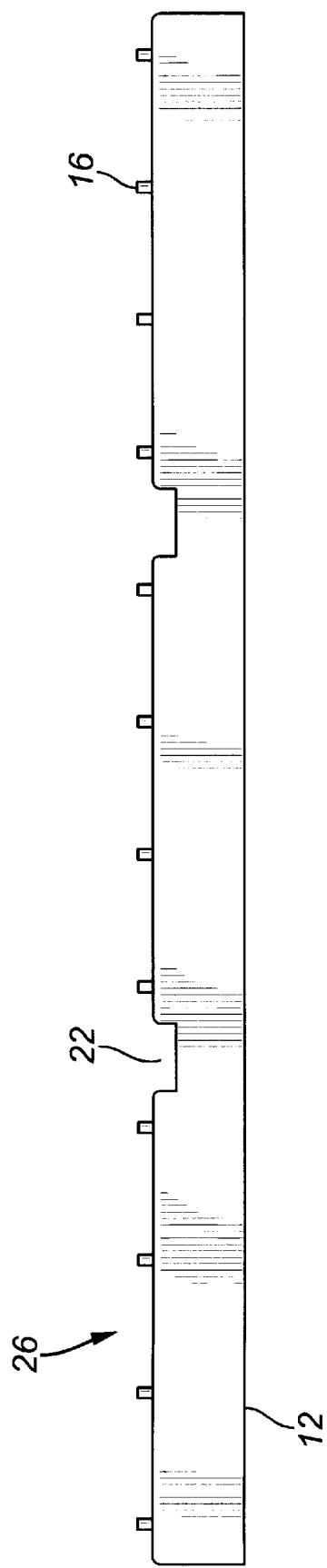

CUSHIONING PAD

BACKGROUND

The present invention relates to a cushioning pad and more particularly relates to a cushioning pad which may be used on oil rigs for workers to stand on to relieve pressure on adjacent portions of the user's anatomy.

Many professions and occupations require that the individual worker stand for long periods of time. On a typical oil rig, workers move tools, drill bits, coiled write and rope across the metal and concrete portions of the rig. Long periods of standing, particularly on hard floors, often results in fatigue, tired legs, sore hips and back. In fact, it is estimated that some seventy five percent of the American public has back pain and over one half of the oil rig workers has back fatigue. Numerous clinics have been set up along the Gulf Coast of the United States, in particular to handle retraining of employees, and teaching workers from oil rigs how to deal with chronic pain.

The present invention has been designed for use on an oil rig to improve fatigue. Generally, a fatigue mat consists of carpeting or some sort of foam or shock absorbing and backings which are placed around work areas, such as machines or otherwise. These mats serve to somewhat cushion the effects of hard surfaces. However, in areas where heavy equipment is used, the mats deform easily and become a tripping hazard. A need has existed for a mat which can sustain heavy equipment pressure, such as from heavy wire cables and tools, without deforming which does not form a tripping hazard and can be removably affixed to an oil rig.

Additionally, the need has existed for a fatigue mat which can tolerate oil, water or chemicals that may spill upon them and make them slippery and therefore unsafe. Additionally, mats are needed which tolerate the existence of or facilitate the flow away of debris, and metal fillings and screws which may otherwise be imbedded in flat mats.

The present invention has been designed with a unique channel construction and a unique rib construction using conventional water resistant materials which are capable of being painted safety yellow to reduce the ability of debris from standing on the mat, by providing a flow away channel, which is removably affixable should the mat become damaged or worn out from use.

The present invention is different from the foot cushioning devices of U.S. Pat. No. 4,179,826 and the inner sole pad of U.S. Pat. No. 4,619,055. Also, it is unlike the folding mat shown in the folding mat and shelter of U.S. Pat. No. 5,059,463, the mat holder made of a flexible material for floor mats shown in U.S. Pat. No. 5,018,235, the cushioning pad of U.S. Pat. No. 4,619,055 which is for footwear and U.S. Pat. No. 3,726,255, the cage mat for chickens which forms a padded mat. The closest discovered art is the pavement mat of U.S. Pat. No. 4,074,948, but this invention is related to use on road surfaces, and hence is not considered prior art to the present invention which is for oil rigs.

DETAILED DESCRIPTION

The detailed construction, use and advantages of the present invention will be more fully understandable from the following description and claims, wherein:

FIG. 3 shows a side view of the mat with the rib members;

Turning now to the drawings, the present invention which is generally designated by the numeral 10 in the Figures is the constructed cushioning pad.

Figure 1:
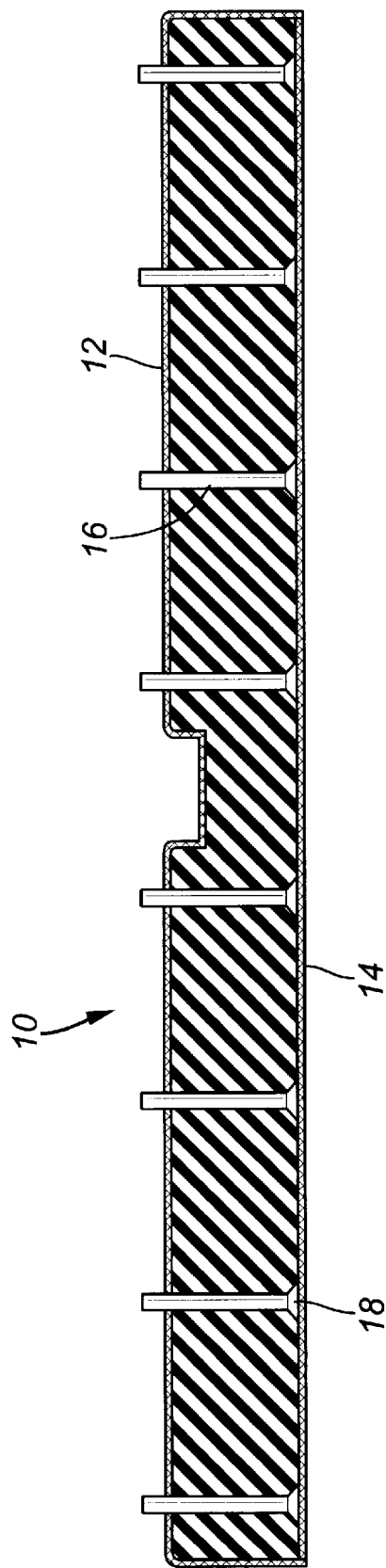
FIG. 1 is a cross sectional view of a mat with interlock mechanism.

Embodiment 10 is a cushioned mat having an upper laminate surface 12, and a base layer 14. The upper laminate surface 12 can be drilled or treated to create holes into which rib members 16 can be located. The rib member 16 must be strong, sturdy material, such as rivets from strong polymer substances or from stainless steel, which are capable of sustaining compression under strong pressure. Rib member 16 can then be coated with material 18, which can be identical to upper laminate surface material 12, or it can be different, such as a coating which resists electrical conductivity, rusting, corrosion, water, and deterioration when exposed to ultraviolet light. Rib members 16 can be hammer rivets having dimensions of ³⁄₁₆ths of an inch×1 inch and the neoprene rubber 18 shown in FIG. 1, is preferably ¾ inch thick.

The cushioning mat 10 can be cut or shaped into the desired form, such as for use on an oil rig with conventional cutting means.

Figure 2:
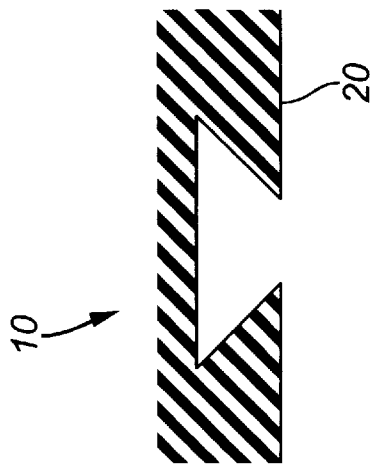
FIG. 2 is a cross sectional view of the cushioning mat with the rib members piercing the upper surface of the laminate material.

FIG. 2 shows the mat 10 in cross section. In a preferred embodiment, as shown here, mat 10 is cut to create a channel with an interlocking mechanism which is 4 inches tall, 8 inches wide at the top and 4 inches wide at the bottom. The cuts are made on at least a 45 degree angle shown as the numbers 45 degrees. It is possible to use a variety of other cuts to accomplished the interlocking mechanism, and in particular, it is important that the channel created, is at least 1 inch in width at the bottom, which in FIG. 2 is shown as numeral 20.

FIG. 3, shows an embodiment of the present invention using 1 inch rivets as rib members 16 extending through the base layer 12 with the interlocking channel 22. In a preferred embodiment the overall dimension of the mat is 1 inch thick at one side and ¾ inch thick at the other opposite edge. Each element 26, between the channels 22 are shown to be 11 and ½ inches wide. The overall width of a cushioned mat in a preferred embodiment is 3 feet long.

Figure 4:
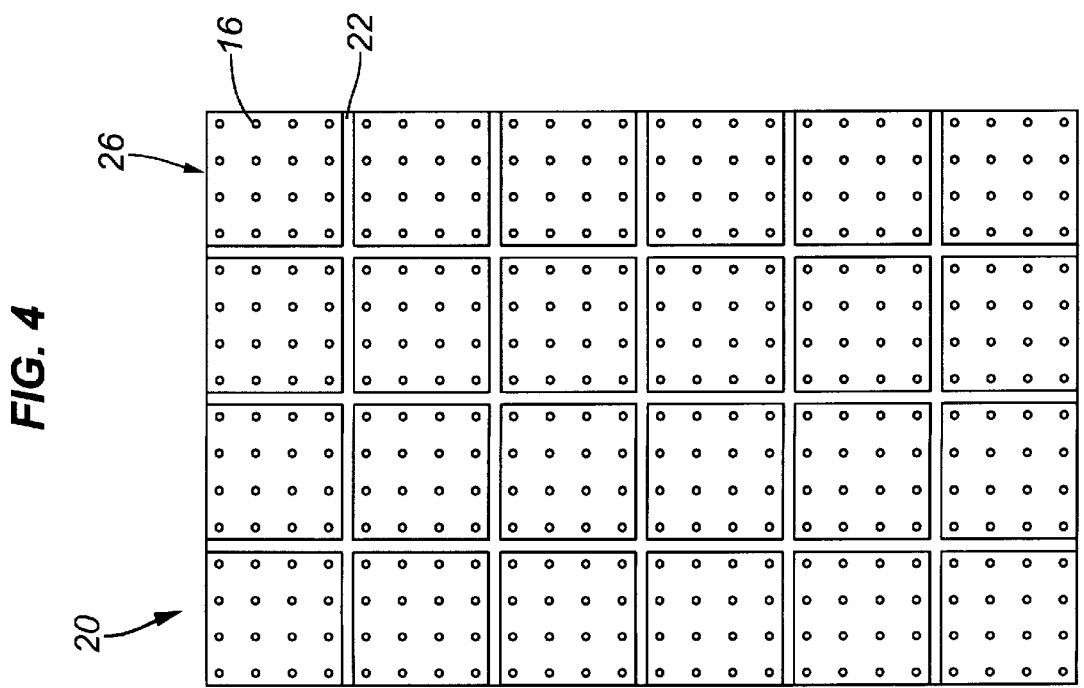
FIG. 4 shows a top view of the mat with 16 rib members per unit.

FIG. 4 shows a top view of the elements of a cushioned mat having 16 rib elements per element. In FIG. 4, the rib members 16 of elements 26 are separated by channels 22. 24 elements are shown in this embodiment of the cushioned mat 10 which has the overall dimension of 4 feet by 6 feet.

Figure 5:
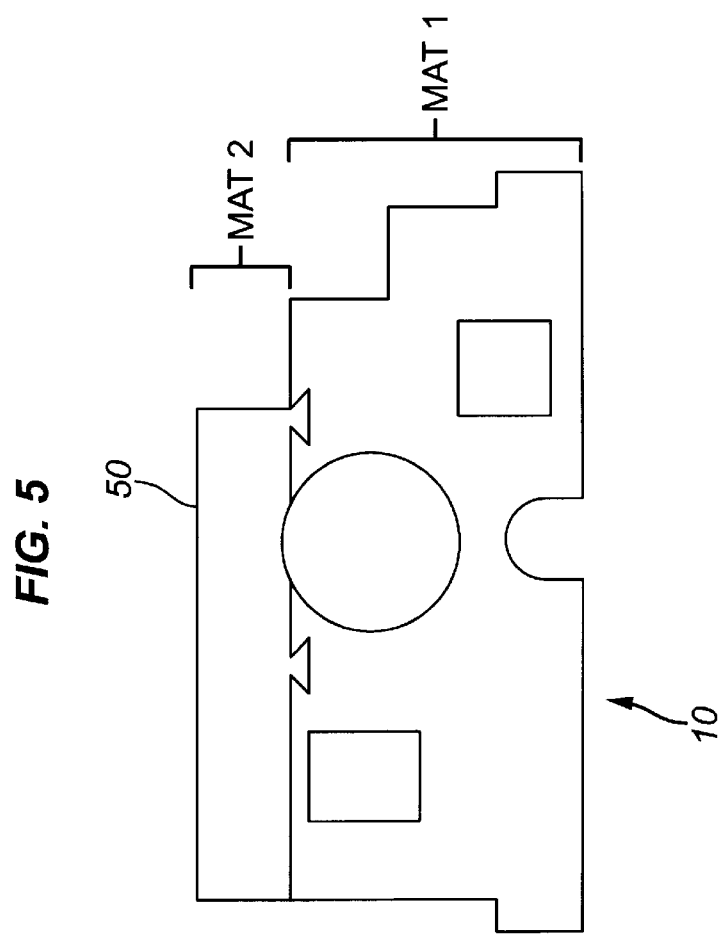
FIG. 5 shows a mat with the interlock mechanism and cutout sections as it would be created for use on an actual oil rig.

FIG. 5 shows a cushioned mat with numerous cut outs in the mat which enable it to be used on an oil rig. More particularly, FIG. 5 depicts a second mat 50 interlocking with the channels 22 of a first mat 10.

The upper laminate is preferably a two component spray in place flexible 100% solids thermoplastic polyurethane/ polyurea system. Although other two part systems may be used, In the preferred embodiment, the upper laminate material is designed for processing through high impingement-mix polyurethane dispensing equipment. Preferably the system for spraying on the upper laminate is a fast cure, textured surface, multi-purpose material designed for commercial and industrial applications. It has good adhesion to many materials and is suitable as a protective-abrasive-impact coating for many types of equipment. This laminate preferably has the following properties, under the ASTM test method D-1622, the density in (pcf) is preferably about 70, although the range may be from 40–110, the hardness (shore "D") under ASTM Test method 2240 is about 45 although hardness may range from 20–60, the abrasion resistance (taber) for D-4060 is about 0.10% per 1000 cycles although various percentages can be used, such as 0.05% to 0.25%, the tensile strength (psi) using ASTM test method D-2370 is about 1800, although the range of 1000–2600 could be used, the elongation in (%) using ASTM test D-2370 is about 115, although a range from about 80 to 140 could be used, the tear resistance (pli) using ASTM test D-1004 is about 300, preferably 304, although range from 260–340 could be used.

The preferred liquid chemical properties of this material at 75 degrees F. are for density, for component A of the two component system using ASTM method D-1638 about 600±100, and for component B of the two component system using ASTM method D-1638 about 1100±100. For specific gravity using ASTM test method D-1638, for component A, the value is preferably 1.15, although a range of ±0.25 can be considered, and for component B, 1.08 with a range of ±0.40 being considered usable, and the mixing ratio of component A to component B can vary, but preferably is 50/50 by volume, however any variation from 20 to 80% could be considered as usable in the present invention. It is anticipated that numerous materials having these characteristics can be used in the present invention. One such material is available from the Burtin Corporation of Santa Ana, Calif. and is known as XS series A, which is a polymeric MDI, which is an aromatic isocyanate having the formula which comprises diphenylmethane diisocyanate. Another material known as XS Series B from the Burtin corporation can be used in the present invention and it is a polyol from the polyurethane family which is in particular a polyester and polyether blend. The base material of the upper laminate can future be mixed with pigment, and other adhesive and elastomeric materials as would be obvious to one skilled in the art.

The base layer is neoprene. In a preferred embodiment, the base layer may be a neoprene mat having a thickness of between ½ inch and 8 inches. The base material may also be a rubber or latex based material. The base material must be selected from a group of materials which are resilient to moisture and are resilient to being deformed after exposure to weight, which is at least 100 per square foot for a short period of time, such as between 5 and 10 minutes.

Neoprene which can be usable in the present invention is available from numerous manufacturers. However, it is possible that a very soft natural latex rubber having resiliency could be usable in this invention. Similarly, synthetic rubbers and plastics having these characteristics will become apparent to those skilled in the art.

The base layer is preferably molded having holes extending from the top surface. The individual cells created through molding may alternatively created by drilling holes into each element of the base layer. The cellular design is for duplicating a method of absorbing shock used in footwear, however, unlike footwear, the present invention uses rib members which are extremely rigid to provide stiffness to the mat.

The upper laminate material can be in the form of a spray or a film. The upper laminate material must be capable of being bonded to the base layer. Although the preferred embodiment involves the spraying on the upper laminate material, such as Line X coating, it is possible that the coating can be brushed on. In an alternative embodiment, the upper laminate material may be adhesively adhered to the base material, such as with an epoxy or similar material. An epoxy which is contemplated for use within the present invention might be XS Series A available from the Burtin Corporation of Santa Ana, Calif. In an alternative embodiment, the upper laminate material can be curable material, which permits a solid bond after curing, resistant to water and heat. In a preferred embodiment, the size of the upper laminate layer is $1/8^{th}$ inch thick, however, it may be in the range of from 0.01 inches in thickness to 2 inches thick depending on the amount of coating needed on the neoprene or base material.

Upper laminate materials may be nylon or polyethylene film which is able of being flexible yet water resistant.

The resulting laminated structure can create a series of elements. These elements, which may be a mat or pad, can be jointed together by a plurality of generally spaced-apart longitudinally and transversely extending members, also known as ribs which extend from the lower surface of said base and extend through holes in the upper surface of the mat. The rib members define a plurality of cells from between 2 and 32 cells. The ribs can be rivets, which preferably are constructed from stainless steel. The elements are created to be strong enough to resist deformation forces sustained by them for a period of time, and further are resilient to application of pressure thereby providing the ability to cushion shock. The combination of elements together create the cushioning mat. It is considered a preferred embodiment to have from 2 to 32 elements, and preferably 16 per square foot in each cushioning mat. Also, in the preferred embodiment, the cushioning mat should utilize rib members, or rivets which are located ½ inch from the edge of the element.

Further, in a preferred embodiment, a channel is contemplated which is located in each element and between elements in certain situations. The channels can be in communication with other channels and though these channels, which can be up to 1 inch in width, air flow is possible, as well as water flow. Additionally, the channels can be created with a unique structure. In the most preferred embodiment, the channels can act as a somewhat flexible interlock mechanism for engaging elements of a first cushioning mat with elements of a second cushioning mat.

The resulting cushioning mat may be created through a molding process. In particular, it may be moldable as a unitary structure of natural latex rubber, prior to the creation of the rib element construction.

This cushioning mat is expected to be used on oil rigs, so that the outer shape of the mat should generally conforming to the shape of platforms or surfaces on an oil rig.

This invention includes a method of making a cushioning mat comprising the steps of: cutting the overall dimensions of the outer perimeter of a base material having an upper side and a lower side, cutting a channel in the upper side of the base material creating raised surfaces and depressed edges, sanding the base material, spraying the base material with a coating consisting of aromatic isocyanates or a two component polyurethane/polyurea system such as Buc XS-100 available from the Line X Offshore Material Coatings Company of Houma, La. (hereafter referenced as the upper laminate material), creating holes in the upper side of the base material, installing rib members, such as with rivets, in the mat by passing rib members through the drilled holes to the lower side of the base material, coating the installed rib members with a coating consisting of the upper laminate material described above.

From the foregoing, it will be apparent that the present invention provides a unique cushioning device for use on oil rigs having substantial applications. The particular configuration of the cushioning mat may be adapted to all situations on an oil rig, and perhaps on a ship. Accordingly, it will be obvious to one skilled in the art to make various changes, alterations and modifications to the cushioning mat described above and also to find numerous other applications for the cushioning material. These and other changes, alterations and modifications are accordingly intended to be compassed within the spirit and scope of the invention and the appended claims.

What is claimed is:

1. A cushioning mat comprising between 2 and 32 elements, each element having the following structure:
   (a) an upper laminate with said upper laminate being resilient to deforming from weight after any application of pressure;
   (b) a lower base layer having an upper and lower surface, said upper surface of said base layer being bonded to said upper laminate;
   (c) a plurality of generally spaced-apart vertically extending rib members extending from the lower surface of said base layer, and wherein said rib members are strong enough to resist deformation forces and resilient to any application of pressure forming a cushioning mat with the ability to cushion shock; and
   each element further being connected by a plurality of channels disposed between elements and wherein said channel acts as an interlock mechanism for engaging with a first cushioning mat with a second cushioning mat.

2. The cushioning mat of claim 1, wherein said upper laminate is a curable water resistant coating.

3. The cushioning mat of claim 1, wherein said base layer is neoprene rubber.

4. The cushioning mat of claim 1, wherein said cushioning mat is molded as a unitary structure of a member of the group consisting of neoprene and natural latex rubber.

5. The cushioning mat of claim 1, wherein said upper laminate has a peripheral configuration generally conforming to the shape of surfaces on an oil rig.

6. The cushioning mat of claim 1, wherein the upper laminate of material is 1/8 inch thick.

7. The cushioning mat of claim 1, wherein the rib members are rivets.

8. The cushioning mat of claim 1, wherein the rib members are located 1/2 inch from the edge of said channel and 16 rib members are located in each element.

9. The cushioning mat of claim 8, wherein the rivets comprise stainless steel.

10. The cushioning mat of claim 9, wherein the rivets are further coated with additional upper laminate.

11. The cushioning mat of claim 1, wherein the upper laminate comprises a curable mixture consisting of: pigment, elastomeric materials and adhesive materials.

12. The cushioning mat of claim 1, wherein the channel is at least 1 inch in width and additionally serves as an interlocking mechanism.

13. The cushioning mat of claim 11, wherein the pigment is yellow.

14. A method of making a cushioning mat comprising the steps of:
   cutting the overall dimensions of the outer perimeter of a base material having an upper side and a lower side;
   cutting a plurality of channels which can function as an interlock mechanism in the upper side of the base material creating elements whereby the interlock mechanism can engage a first cushioning mat with a second cushioning mat;
   sanding the base material;
   spraying the base material with a coating having a density of at least 70 pcf, a harness of at east 45, a tensile strength of at least 1800 psi, and a tear resistance of at least 300 pli and creating an upper laminate;
   creating holes in the upper side of the base material;
   installing rib members in the base material by passing rib members through the created holes to the lower side of the base material;
   coating the installed rib members with a coating consisting of the same material as the upper laminate.

15. The method of claim 14, wherein the base material is neoprene.

16. The method of claim 14, wherein the rib members are rivets.

17. The method of claim 14, wherein the channel is cut to create an interlocking mechanism for connecting a first cushioning mat to a second cushioning mat and a width of at least 1 inch.

18. The method of claim 14, wherein between 2 and 32 holes are created in the upper side of the base material.

19. The method of claim 18, wherein 16 holes are created in the upper side of the base material approximately 1/2 inch from the edge of the channel.

\* \* \* \* \*